US012136822B2

(12) United States Patent
Tanaka et al.

(10) Patent No.: US 12,136,822 B2
(45) Date of Patent: *Nov. 5, 2024

(54) MESH NETWORK FOR POWER RETRANSMISSIONS

(71) Applicant: FUNAI ELECTRIC CO., LTD., Daito (JP)

(72) Inventors: Yoshiki Tanaka, Osaka (JP); Shinichi Kodama, Shijonawate (JP); Tetsuya Shihara, Kadoma (JP)

(73) Assignee: FUNAI ELECTRIC CO., LTD., Daito (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/810,464

(22) Filed: Jul. 1, 2022

(65) Prior Publication Data

US 2023/0068701 A1 Mar. 2, 2023

Related U.S. Application Data

(63) Continuation of application No. 17/462,863, filed on Aug. 31, 2021, now Pat. No. 11,381,110.

(51) Int. Cl.
*H02J 50/00* (2016.01)
*H02J 50/20* (2016.01)
(Continued)

(52) U.S. Cl.
CPC ............ *H02J 50/001* (2020.01); *H02J 50/20* (2016.02); *H02J 50/50* (2016.02); *H02J 50/80* (2016.02)

(58) Field of Classification Search
CPC .......... H02J 50/001; H02J 50/20; H02J 50/50; H02J 50/502
See application file for complete search history.

(56) References Cited

U.S. PATENT DOCUMENTS

| 2008/0100423 A1* | 5/2008 | Geissler ............. G06K 19/0723 340/10.1 |
| 2009/0152954 A1* | 6/2009 | Le .......................... H02J 50/20 307/110 |

(Continued)

FOREIGN PATENT DOCUMENTS

| CN | 101258761 A | 9/2008 |
| CN | 110326189 A | 10/2019 |

(Continued)

OTHER PUBLICATIONS

Extended European Search Report directed to European Patent Application No. 22191745.3, mailed Apr. 21, 2023, European Patent Office, 10 pages.

(Continued)

*Primary Examiner* — Rexford N Barnie
*Assistant Examiner* — Rasem Mourad
(74) *Attorney, Agent, or Firm* — Sterne, Kessler, Goldstein & Fox P.L.L.C.

(57) ABSTRACT

Aspects are described for a device comprising a wireless transceiver configured to receive a radio frequency (RF) emission from a source device, an energy-harvesting unit configured to charge the first device wirelessly, using a first part of the RF emission, and a processor communicatively coupled to the transceiver. The processor is configured to modulate the first part of the RF emission based on information detected by the device and determine that an energy level of the device is above a threshold. The processor is further configured to transmit, in response to determining that the energy level is above the threshold, using the wireless transceiver, the modulated first part of the RF emission to the source device. The processor is further configured to transmit, in response to determining that the energy level is above the threshold, using the wireless (Continued)

transceiver, a second part of the RF emission wirelessly to another device to charge the other device.

10 Claims, 7 Drawing Sheets

(51) Int. Cl.
*H02J 50/50* (2016.01)
*H02J 50/80* (2016.01)

(56) References Cited

U.S. PATENT DOCUMENTS

| | | |
|---|---|---|
| 2010/0079009 A1 | 4/2010 | Hyde et al. |
| 2010/0142509 A1 | 6/2010 | Zhu et al. |
| 2011/0018494 A1* | 1/2011 | Mita ................. H02J 50/12 320/108 |
| 2011/0156640 A1 | 6/2011 | Moshfeghi |
| 2015/0186702 A1* | 7/2015 | Pletcher ............ G06K 7/10316 340/686.6 |
| 2015/0303741 A1* | 10/2015 | Malik .................... H02J 50/80 307/104 |
| 2015/0372541 A1* | 12/2015 | Guo .................... H02M 7/217 307/104 |
| 2015/0380973 A1 | 12/2015 | Scheb |
| 2016/0254844 A1* | 9/2016 | Hull .................... H04B 5/0037 340/6.1 |
| 2017/0025857 A1 | 1/2017 | Matthews |
| 2017/0085112 A1 | 3/2017 | Leabman |
| 2018/0159338 A1 | 6/2018 | Leabman et al. |
| 2019/0334383 A1 | 10/2019 | Mita |
| 2019/0372402 A1 | 12/2019 | Mese et al. |
| 2020/0083968 A1 | 3/2020 | Greene |
| 2020/0257136 A1* | 8/2020 | Arbabian ................. H02N 2/18 |
| 2020/0395788 A1 | 8/2020 | Greene et al. |

FOREIGN PATENT DOCUMENTS

| | | |
|---|---|---|
| CN | 111066349 A | 4/2020 |
| JP | 2012070565 A | 4/2012 |
| JP | 2013162630 A | 8/2013 |
| JP | 2013169100 A | 8/2013 |
| JP | 2017530570 A | 10/2017 |
| JP | 2020-533838 A | 11/2020 |
| KR | 20190080728 A | 6/2019 |
| WO | 2020206372 A1 | 10/2020 |

OTHER PUBLICATIONS

Memon et al., "Backscatter Communications: Inception of the Battery-Free Era—A Comprehensive Survey," Electronics 2019, 8, 129, doi: 10.3390/electronics8020129 (Jan. 26, 2019).
Japanese Office Action directed to Japanese Appl. No. 2022-136438, dated Nov. 25, 2022, 5 pages.
Extended European Search Report directed to related European Application No. 22191745.3, mailed on Jul. 3, 2023, 10 pages.
Office Action, dated Jan. 25, 2024, for Chinese Patent Appl. No. 202210986172.3, 14 pages, including search report dated Jan. 23, 2024.

\* cited by examiner

MESH NETWORK FOR POWER RETRANSMISSIONS

CROSS-REFERENCE TO RELATED APPLICATIONS

This application is a continuation application of U.S. application Ser. No. 17/462,863, filed Aug. 31, 2021, entitled "Mesh Network for Power Retransmissions," which is incorporated herein by reference in its entirety.

BACKGROUND

Field

The described aspects generally relate to power retransmissions in a mesh network.

Related Art

A mesh network is a network that includes electronic devices that communicate with each other wirelessly. In a mesh network, devices (sometimes called nodes) connect directly, dynamically and non-hierarchically to as many other nodes as possible and cooperate with one another to efficiently route data.

Mesh networks can be useful to gather data collected from sensor networks. In such networks, sensor devices detect conditions of nearby environments. For example, the sensor devices can be deployed in storage spaces, where the sensor devices detect occupancy statuses or a presence of an object of the storage devices. The sensor devices can also be deployed in medical facilities, where the tag devices monitor statuses of patients. In some aspects, the sensor devices transmit gathered information, such as the occupancy statuses and the patient statuses, to a source device.

In some aspects, the electronic devices of the mesh network are wireless devices. The electronic devices can be powered by internal batteries. However, the internal batteries have limited capacity and also require replacement or wired charging from time to time. The replacements and charging can be costly and troublesome.

Wireless power transmission is the transmission of electrical energy without wires as a physical link. Various techniques for wireless power charging exist. For example, power transmission may be made via radio waves, including microwaves. However, power transmission falls off quickly as the distance between a source and target device increases. For this reason, over distances, power transmission via radio waves often amounts to little more than trickle charging.

Improved methods of charging sensor devices in a mesh network are needed.

SUMMARY

Some aspects of this disclosure relate to apparatuses and methods for implementing power retransmissions in a mesh network. For example, systems and methods are provided for wireless power retransmissions between devices in the mesh network.

Some aspects of this disclosure relate to a device comprising a wireless transceiver configured to receive a radio frequency (RF) emission from a source device, an energy-harvesting unit configured to charge the first device wirelessly, using a first part of the RF emission, and a processor communicatively coupled to the transceiver. The processor is configured to modulate the first part of the RF emission based on information detected by the device and determine that an energy level of the device is above a threshold. The processor is further configured to transmit, in response to determining that the energy level is above the threshold, using the wireless transceiver, the modulated first part of the RF emission to the source device. The processor is further configured to transmit, in response to determining that the energy level is above the threshold, using the wireless transceiver, a second part of the RF emission wirelessly to another device to charge the other device.

Some aspects of this disclosure relate to a method of operating a device communicating with a source device. The method comprises receiving an RF emission from the source device and charging the first device wirelessly using a first part of the RF emission. The method further comprises modulating the first part of the RF emission based on information detected by the device and determining that an energy level of the device is above a threshold. The method further comprises transmitting the modulated first part of the RF emission to the source device and transmitting a second part of the RF emission wirelessly to another device to charge the other device, in response to determining that the energy level is above the threshold.

Some aspects of this disclosure relate to a system comprising a source device, a first device, and a second device. The source device is configured to transmit an RF emission wirelessly to the first device. The first device is configured to receive the RF emission from the source device and charge the first device wirelessly, using a first part of the RF emission. The first device is further configured to transmit a second part of the RF emission wirelessly to a second device. The second device is configured to receive the second part of the RF emission and charge the second device wirelessly, using the second part of the RF emission.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Disclosed herein are apparatuses and methods for implementing wireless power retransmissions in a mesh network. According to embodiments, a device receives power through RF transmission from a source device. The device assesses whether it has reached a threshold level of energy gathered through wireless charging. After it has reached the threshold level, the device transmits information it has collected to the source device. It transmits the information collected by modulating at least a portion of the RF signal it receives from the source device.

In this way, embodiments provide that the device is power by the source device wirelessly. Therefore, the device no longer requires battery or battery replacements. In addition, the threshold level ensures signal qualities of the transmission of the device when it arrives at the source device.

Electronic devices in the mesh network include, but are not limited to, tag devices, wireless sensor devices, wireless communication devices, home entertainment devices, smartphones, laptops, desktops, tablets, personal assistant devices, monitors, televisions, wearable devices, Internet of Things (IoT) devices, vehicle onboard devices, surveillance devices, and the like.

The source device can be a base station, a router, a control center, a television, customer-premises equipment, and the like. For another example, the mesh network can be a wireless sensor network that includes sensor devices, such as wireless sensors. The wireless sensors gather information, such as temperature, sound, and pressure, in locations of the wireless sensors and transmit to a source device, such as a base station. For another example, the mesh network can be a smart home network. The electronic devices can be smart home devices, such as cameras, smart meters, light control devices, home entertainment devices, and so on. A user can communicate with and control the smart home devices through a source device, such as a central computer or a smart phone.

In some aspects, the electronic devices rely on wireless charging to support operations of the electronic devices. For example, the electronic devices can harvest energies from radio frequency (RF) emissions from the source device.

In some aspects, a first electronic device locates outside a range of the source device. In other words, the RF emission from the source device does not reach the first electronic device. In such as case, a second electronic device, located between the source device and the first electronic device, can relay the RF emission from the source device to the first electronic device. For example, the second electronic device can reflects the RF emission received from the source device.

Figure 1:
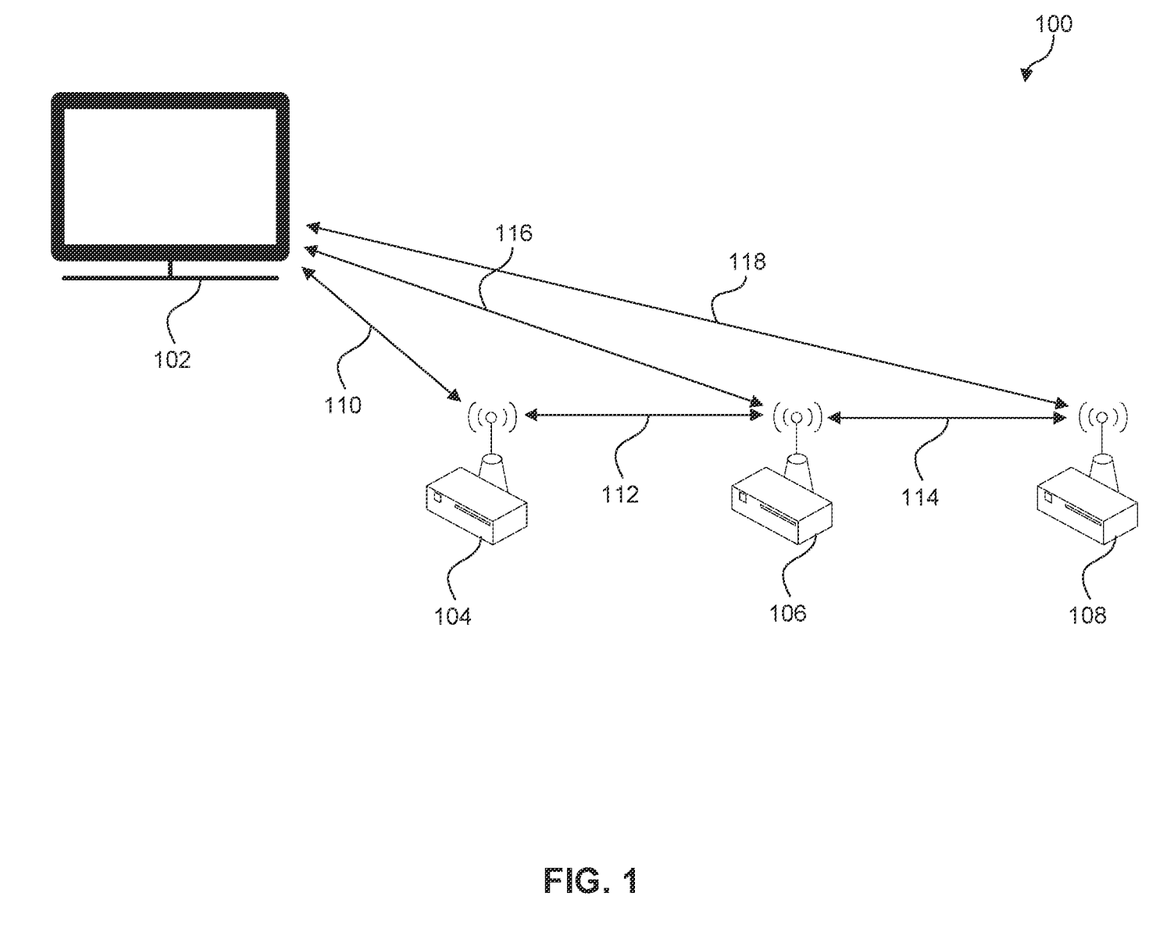
FIG. 1 illustrates an example system implementing power retransmissions in a mesh network, according to some aspects of the disclosure.

FIG. 1 illustrates an example system 100 implementing power retransmissions of a mesh network, according to some aspects of the disclosure. Example system 100 is provided for the purpose of illustration only and does not limit the disclosed aspects. System 100 may include, but is not limited to, a source device 102 and electronic devices 104, 106, and 108. The source device 102 may include, but is not limited to, a television, a base station, an access points (AP), a router, a control center, a smart phone, a computer, customer-premises equipment, and the like. The electronic devices 104, 106, and 108 may include, but is not limited to, tag devices, wireless sensor devices, wireless communication devices, smartphones, laptops, desktops, tablets, personal assistants, monitors, televisions, wearable devices, Internet of Things (IoT) devices, vehicle communication devices, and the like.

In some aspects, the electronic devices 104, 106, and 108 can communicate with each other in a mesh network. For example, the electronic device 104 communicates with the electronic device 106 via a wireless connection 112. The electronic device 106 communicates with the electronic device 108 via a wireless connection 114. The electronic device 104 can also communicate with the electronic device 108 indirectly via the electronic device 106. In some aspects, the source device 102 can communicate with the electronic devices 104, 106, and 108 via wireless connections 110, 116, and 118, respectively. In other aspects, the source device 102 communicates with electronic devices 106 and 108 indirectly via the electronic device 104. For example, the electronic devices 106 and 108 may locate outside a range of the source device 102.

In some aspects, the electronic devices 104, 106, and 108 may perform an initialization process for authentication. For example, the electronic devices 104, 106, and 108 are assigned with a pre-shared key sequence and use the pre-shared key sequence to encrypt and decrypt messages communicated among them. The electronic device 104 can encrypt a message with the pre-shared key and transmits the encrypted message to the electronic device 106 via the wireless connection 112. The electronic device 106, upon receiving the encrypted message, can decrypt and retrieve the message using the pre-shared key sequence. In some aspects, the electronic devices 104, 106, and 108 receive the pre-shared key sequence from a network controller (not shown). The pre-shared key sequence can also be generated by the electronic devices 104, 106, and 108. For example, the electronic device 104 can generate the pre-shared key sequence and transmit it to the electronic devices 106 and 108 to be used in later communications. In other aspects, the mesh network employs asymmetric encryption. In other words, the electronic devices 104, 106, and 108 share their public key sequences with each other and encrypt the messages using the public key sequences. For example, electronic device 104 encrypts the message using the public key sequence of 106, which is shared by the electronic device 106 previously, and transmits the encrypted message to the electronic device 106. The electronic device 106, upon receiving the encrypted message, can decrypt it using a private key of the electronic device 106, wherein the private key sequence of the electronic device 106 corresponds to the public key sequence of the electronic device 106.

In some aspects, the electronic device 104 can harvest energies from RF emissions received from the source device 102. The RF emission includes Wi-Fi signals, Bluetooth™ signals, cellular signals, such as 4G signals and 5G signals, television signals, or other kinds of RF signals. The electronic device 104 can operate using the harvested energies. For example, the electronic device 104 can monitor patient status and/or gather environment information using the harvested energies. The electronic device 104 can also transmit information back to the source device 102 using the harvested energies.

In some aspects, the electronic device 104 can reflect a portion of the RF emissions received from the source device 102 to the electronic device 106. For example, the electronic device 104 reflects the portion of the RF emission by changing an impedance of a transceiver of the electronic device 104. In some aspects, the electronic device 104 reflects the portion of the RF emission by determining that an energy level of the electronic device 104 is above a threshold. Similarly, the electronic device 106 can harvest energies from the portion of the RF emission to operate. In some aspects, the electronic device 106 can also reflect a sub-portion of the RF emission to the electronic device 108 by determining that an energy level of the electronic device 106 is above a threshold. The thresholds of the electronic devices 104 and 106 can be the same or different.

In some aspects, the electronic device 104 reflects the portion of the RF emission to the electronic device 106 after transmitting the gathered information back to the source device 102.

In some aspects, the electronic devices 106 and 108 transmit information back to the source device 102 indirectly. For example, the electronic device 106 transmits, via the wireless connection 112, the information to the electronic device 104, which relays the information to the source device 102 via the wireless connection 110. Similarly, the electronic device 108 transmits the information to the source device 102 through a two-hop relay via the electronic devices 104 and 106. In some aspects, the electronic devices 106 and 108 transmit information indirectly based on energy levels of the electronic devices 106 and 108. In other aspects, the electronic devices 106 and 108 transmit information indirectly based on a configuration message received. For example, the source device 102 transmits the configuration message to the electronic devices 106 and 108 indicating indirect or direct transmissions to the source device 102.

In some aspects, the source device 102 discovers the mesh network by broadcasting an initialization message. The initialization message may request electronic devices receiving it to send a feedback message to the source device 102. The electronic devices 104, 106, and 108 may receive the initialization message and send feedback messages back to the source device 102 via the wireless connections 110, 116, and 118, respectively. In some aspects, the electronic device 104 is physically closer to the source device 102 compared with the electronic devices 106 and 108. Therefore, the feedback message from the electronic device 104 arrives at the source device 102 earlier than those of the electronic devices 106 and 108. In such a case, the source device 102 determines that the electronic device 104 is a host device and broadcast the selection of the host device to the electronic devices 104, 106, and 108.

In some aspects, the source device 102 configures the RF emission based on the selection of the host device. For example, the source device 102 configures one or more beams of the RF emission to point to the host device, such as the electronic device 104. For another example, the source device 102 configures a transmission power of the RF emission based on a signal power level of the feedback message received from the host device, such as the electronic device 104. Specifically, the source device 102 transmits the initialization message with a high power level to attempt to reach at least the electronic device 104 (e.g., a nearest electronic device capable of retransmission), because channel conditions of the wireless connection 110, such as a path loss and fading effects, are not known. Once the source device 102 receives a feedback message from the electronic device 104, the source device 102 or any involved electronic device 104, 106, and/or 108, for example, may adjust the power level of a transmission or retransmission accordingly. For example, in some aspects, source device 102 may determine, based at least in part on the feedback message from electronic device 104 (e.g., any information contained therein or derived therefrom, with respect to power level, distance, angle, etc.), an appropriate power level for subsequent transmission to or from electronic device 104. Additionally, or alternatively, electronic device 104 (or 106, 108, etc.) may determine, based at least in part on an emission from source device 102 (e.g., any information contained therein or derived therefrom), an appropriate power level for retransmission to any other device or back to source device 102, in some aspects.

For example, a transmission power level may be increased as necessary to establish a communication link via wireless connections 112 or 114. Additionally, or alternatively, a transmission power level may be decreased, so as to reduce possible interference that may affect other devices, for some example use cases. In order to make such adjustments, source device 102 or any capable electronic devices (e.g., 104, 106, 108) may be configured, via specific circuitry, programmable circuitry, and/or any other computing means (e.g., processor 504), to determine whether a power level is above or below a given threshold to establish the communication link, and/or whether a power level is above or below a given threshold sufficient to cause interference to other electronic devices within range (if such other electronic devices have been detected), according to some aspects and for some further example use cases. Based on either or both of these determinations, including via any averaging and/or weighting algorithms, source device 102 or electronic devices 104, 106, 108, etc., may configure or reconfigure a power level to adjust (to raise or to lower) a power level of a transmission or retransmission, or may determine that no adjustment is needed to a power level, at least until another electronic device is detected, according to some example aspects.

In some aspects, the power level of the initialization message depends on capabilities of the source device 102. For example, the source device 102 configures the power level of the initialization message based on a range of the source device 102. The source device 102 can also configure the power level based on RF situations around the source device 102. For example, the source device 102 may constrain the power level to reduce interference to other nearby devices. In addition, the source device 102 can configure the power level of the initialization message based on a distribution of the mesh network. For example, the source device 102 may determine that the mesh network of electronic devices 104, 106, and 108 has a relatively sparse distribution. In such a case, the electronic device 102 can configure the power level to be relatively high, such as at or near a maximum power level of the electronic device 102 (e.g., per device capability or configuration). On the other hand, the electronic device 102 may determine that the mesh network has a relatively dense distribution and may accordingly configure the power level to be lower, such as 40-50% of the maximum power level of the electronic device 102, in some example use cases.

In some aspects, the electronic devices 104, 106, and 108 establish the wireless connections 112 and 114 prior to receiving the initialization message from the source device 102. For example, the electronic devices 104, 106, and 108 establishes the wireless connections 112 and 114 via neighbor discovery processes. Therefore, the electronic device 104 has location information of the electronic devices 106 and 108. In some aspects, the electronic devices 104, 106, and 108 have location information of each other.

In some aspects, the location information includes angles of arrival. The electronic devices 104, 106, and 108 can determine the location information of each other by measuring angles of arrival. For example, the electronic device 104 can determine the location information of the electronic device 106 by measuring an angle of arrival of signals from the electronic device 106, wherein the angle of arrival corresponds to a strongest receiving signal power. The electronic device 104 can then transmit to the electronic device 106 in a direction corresponding to the angle of arrival. More details of measuring the angles of arrival are discussed further below.

Figure 2A:
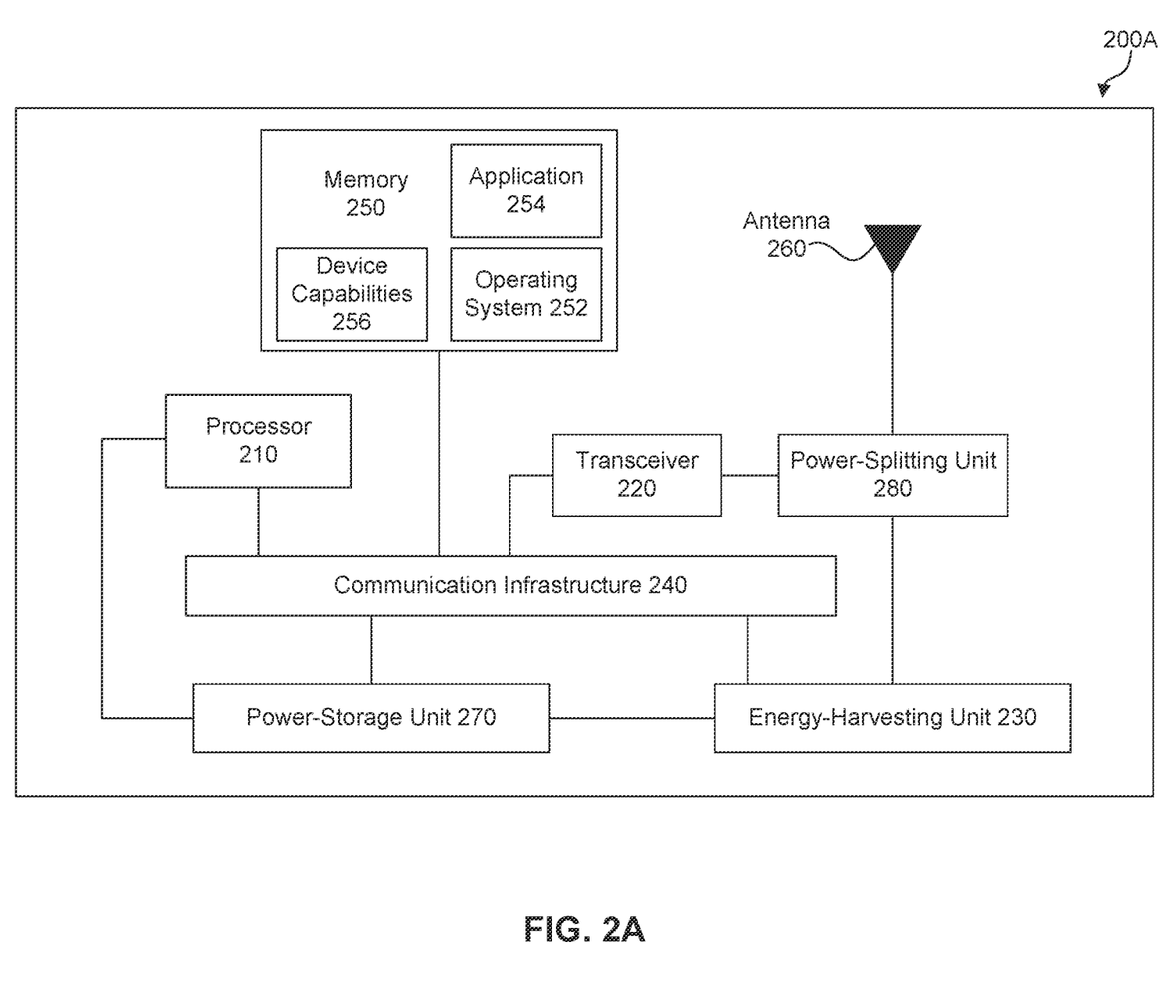
FIGS. 2A-2B illustrate block diagrams of example systems of an electronic device for the power retransmissions in the mesh network, according to some aspects of the disclosure.

FIG. 2A illustrates a block diagram of an example system 200A of an electronic device implementing the power retransmissions of a mesh network, according to some aspects of the disclosure. The system 200A may be any of the devices (e.g., the source device 102 and the electronic devices 104, 106, and 108) of the system 100. The system 200A includes a processor 210, one or more transceivers 220, an energy-harvesting unit 230, a communication infrastructure 240, a memory 250, an operating system 252, an application 254, one or more antennas 260, one or more power-storage unit 270, and a power-splitting unit 280. Illustrated systems are provided as exemplary parts of system 200A, and system 200A may include other circuit(s) and subsystem(s). Also, although the systems of system 200A are illustrated as separate components, the aspects of this disclosure may include any combination of these, e.g., less, or more components.

The memory 250 may include random access memory (RAM) and/or cache, and may include control logic (e.g., computer software) and/or data. The memory 250 may include other storage devices or memory. According to some examples, the operating system 252 may be stored in the memory 250. The operating system 252 may manage transfer of data from the memory 250 and/or the one or more applications 254 to the processor 210 and/or the one or more transceivers 220. In some examples, the operating system 252 maintains one or more network protocol stacks (e.g., mesh network protocol stack, Wi-Fi protocol stack, Internet protocol stack, cellular protocol stack, and the like) that may include a number of logical layers. At corresponding layers of the protocol stack, the operating system 252 includes control mechanisms and data structures to perform the functions associated with that layer.

According to some examples, the application 254 may be stored in the memory 250. The application 254 may include applications (e.g., user applications) used by wireless system 200A and/or a user of wireless system 200A. The applications in the application 254 may include applications such as, but not limited to, environment sensing, power control, configuration control, radio streaming, video streaming, remote control, and/or other user applications.

The system 200A may also include the communication infrastructure 240. The communication infrastructure 240 provides communication between, for example, the processor 210, the one or more transceivers 220, the energy-harvesting unit 230, the memory 250, and the power-storage unit 270. In some implementations, the communication infrastructure 240 may include a bus. In some further aspects, the communication infrastructure 240 or bus may additionally include a bus controller.

The processor 210, alone, or together with instructions stored in the memory 250 performs operations enabling system 200A of the system 100 to implement the power retransmissions of the mesh network, as described herein. Alternatively, or additionally, the processor 210 can be "hard coded" to implement antenna mapping for uplink performance improvement, as described herein.

The one or more transceivers 220 transmit and receive communications signals support the power retransmissions of the mesh network. In some aspects, the one or more transceivers 220 include front end components, such as amplifiers, mixers, band-pass filters (BPFs), local oscillators, and/or other signal generators or equivalent sources, for example. The one or more transceiver 220 may also include a variable impendence to adjust an impedance matching. Additionally, the one or more transceivers 220 transmit and receive communications signals that support mechanisms for measuring communication link(s), generating and transmitting system information, and receiving the system information. According to some aspects, the one or more transceivers 220 may be coupled to the antenna 260 to wirelessly transmit and receive the communication signals. For example, the antenna 260 receives the RF emissions from the source device 102. Antenna 260 may include one or more antennas that may be the same or different types. The one or more transceivers 220 allow system 200A to communicate with other devices that may be wired and/or wireless. In some examples, the one or more transceivers 220 may include processors, controllers, radios, sockets, plugs, buffers, and like circuits/devices used for connecting to and communication on networks. According to some examples, the one or more transceivers 220 include one or more circuits to connect to and communicate on wired and/or wireless networks.

According to some aspects of this disclosure, the one or more transceivers 220 may include a cellular subsystem, a sensor network subsystem, a WLAN subsystem, and/or a Bluetooth™ subsystem, each including its own radio transceiver and protocol(s) as will be understood by those skilled in the arts based on the discussion provided herein. In some implementations, the one or more transceivers 220 may include more or fewer systems for communicating with other devices.

In some examples, the one or more the transceivers 220 may include one or more circuits (including a WLAN transceiver) to enable connection(s) and communication over WLAN networks such as, but not limited to, networks based on standards described in IEEE 802.11.

Additionally, or alternatively, the one or more the transceivers 220 may include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, the transceiver 220 may include a Bluetooth™ transceiver.

Additionally, the one or more the transceivers 220 may include one or more circuits (including a cellular transceiver) for connecting to and communicating on cellular networks. The cellular networks may include, but are not limited to, 3G/4G/5G networks such as Universal Mobile Telecommunications System (UMTS), Long-Term Evolution (LTE), and the like. For example, the one or more transceivers 220 may be configured to operate according to one or more of Rel-15, Rel-16, Rel-17, or other releases of 3GPP standard.

The system 200A may also include the energy-harvesting unit 230. The energy-harvesting unit 230 receives the RF emissions from the antenna 260, wherein the RF emission is transmitted by the source device 102 or other electronic devices, such as electronic device 104. In some aspects, the RF emission received by the antenna 260 is split by the power-splitting unit 280. For example, the power-splitting unit 280 receives the RF emission from the antenna 260 and splits the RF emission into a first RF emission and a second RF emission. The power-splitting unit 280 can split the RF emission by a percentage. For example, the power-splitting unit 280 may split the RF emission equally. The power-splitting unit 280 can be a resistive power splitter, a hybrid power splitter, or other kinds of power splitters. After splitting, the power-splitting unit 280 transmits the first RF emission to the energy-harvesting unit 230 and transmits the second RF emission to the transceiver 220. The energy-harvesting unit 230 gathers electrical energies from the first RF emission and stores the electrical energies in the power-storage unit 270. In some aspects, the power-storage unit 270 is also referred to as an energy-storage unit. The power-storage unit 270 comprises at least one of a battery, a capacitor, or a combination thereof. In some aspects, the power-storage unit 270 provides the electrical energies to other components of the system 200A, such as the processor 210 and the transceiver 220.

In some aspects, the system 200A may also include a sensor unit (not shown). The sensor unit can gather information, such as occupancy statuses, presence statutes, patient statuses, and environment information as described above. The sensor unit stores the information in the memory 250. The power-storage unit 270 also provides the electrical energies to the sensor unit.

In some aspects, the processor 210, coupled to the transceiver 220, can demodulate and/or decode the second RF emission received by the transceiver 220. For example, the processor 210 detects, from the second RF emission, a configuration message transmitted by the source device 102 as described above in FIG. 1. In some aspects, the configuration message indicates information required by the source device 102. The processor 210 extracts the information from the memory 250 and modulates the information to transmit back to the source device 102. For example, the processor 210 modulates the information as a backscatter signal and transmits the backscatter signal to the source device 102 by reflecting the second RF emission. Specifically, the processor 210 processes a first part of the second RF emission to detect the configuration message and reflects a second part of the second RF emission back to the source device 102 as the backscatter signal. In other words, the second RF emission is further split into two parts.

In some aspects, the processor 210 modulate the second part of the second RF emission by varying power levels of the second part of the second RF emission when reflecting it back to the source device 102. For example, the processor 210 modulates the second part of the second RF emission, such as using an ON-OFF shift keying modulation scheme and/or comparable technique(s) as described in additional detail further below. In some aspects, the ON-OFF shift keying modulation scheme may also refer to an ON-OFF keying (OOK) modulation scheme. Specifically, the transceiver 220 further comprises the variable impedance as described above. The processor 210 controls an impedance value of the variable impedance to modulate the second part of the second RF emission. The power levels of the reflected second part of the second RF emission from the antenna 260 to the source device 102 depend on matching of the impedance value of the transceiver 220 and an impedance value of the antenna 260.

Figure 6:
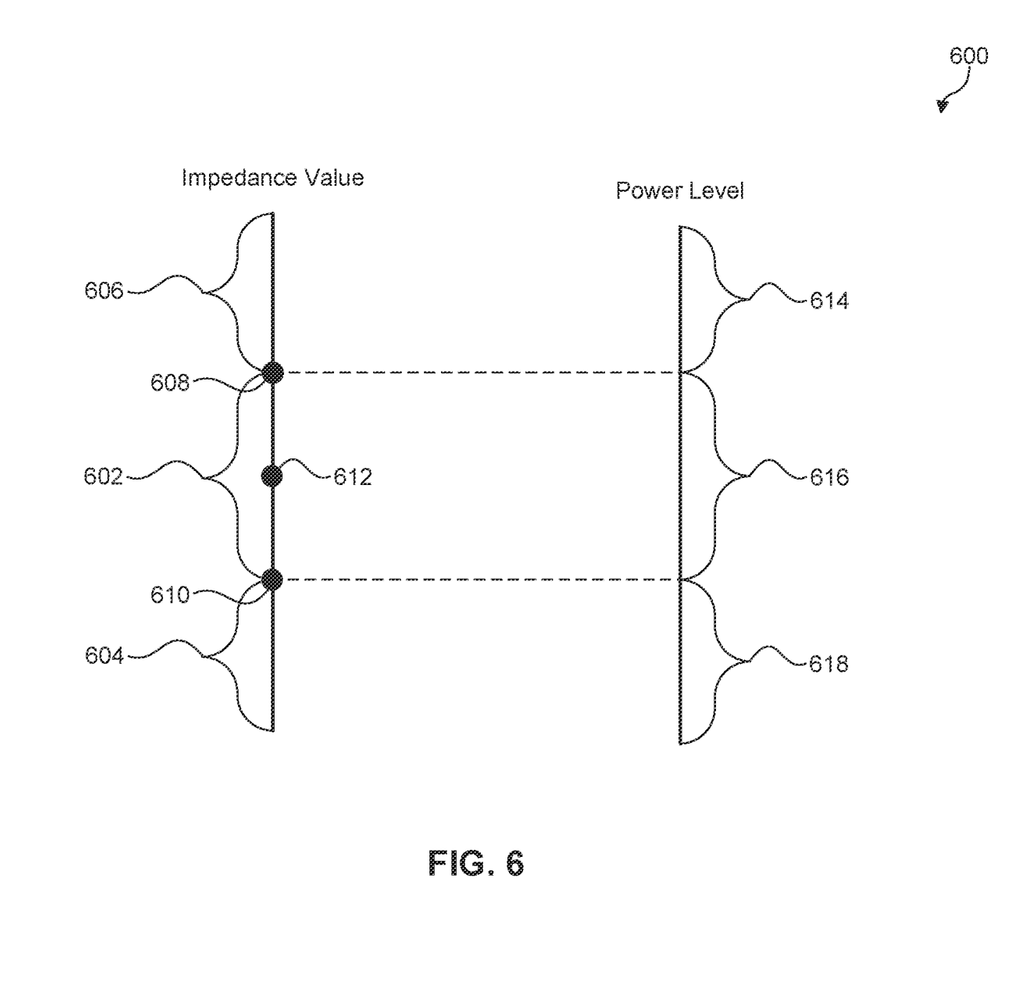
FIG. 6 illustrates an example of an ON-OFF shift keying modulation using a variable impedance.

For example, as described in FIG. 6, the processor 210 can configure the impedance value of the variable impedance to be in impedance ranges 602, 604, or 606. The impedance range 602 can be a characteristic impedance range with an upper bound 608, a lower bound 610, and a middle point 612. For example, the upper bound 608, the lower bound 610, and the middle point 612 can be 150 ohms, 50 ohms, and 17.5 ohms, respectively. When the impedance value is within the impedance range 602, the second part of the second RF emission passes through and is not reflected to the source device 102. Accordingly, a power level of the reflected second part of the second RF emission is low and corresponds to a power level range 616. The source device 102 can estimate the power level based on received signals in a time period and determine that the power level is within the power level range 616. In such a case, the source device 102 determines that a received binary value to be "1", On the other hand, the impedance value can be within the impedance ranges 606 and 604, outside the impedance range 602. In such a case, the second part of the second RF emission is reflected to the source device 102. Accordingly, the power level of the reflected second part of the second RF emission is high and corresponds to power levels ranges 614 or 618. The source device 102 can estimate the power level based on the received signals in a time period and determine that the power level is within the power level ranges 614 or 618. In such a case, the source device 102 determines that the received binary value to be "0". In a nutshell, "0" corresponds to a high power level, and "1" corresponds to a low power level.

The reflected signals, such as the reflected second part of the second RF emission, also referred to as backscatter signals, may be modulated using ON-OFF shift keying or other modulation schemes described further below. Devices, such as the source device 102, receiving the reflected second part of the second RF emission, decodes the binary sequence by measuring the power levels of the reflected second part of the second RF emission. In some aspects, the antenna 260 comprises a first element and a second element. In some aspects, the system 200A receives the RF emission using the first element of the antenna 260, and separately reflects the second part of the second RF emission using the second element of the antenna 260. In other aspects, the system 200A receives the RF emission and reflects the second part of the second RF emission both using the same element of the antenna 260.

In some aspects, the processor 210 transmits the information by generating report signals. For example, the processor 210, coupled with the transceiver 220, generates a modulated signal based on the information using modulations techniques, such as amplitude modulation (AM), frequency modulation (FM), frequency shift keying (FSK), phase shift keying (PNK), binary PSK (BPSK), amplitude shift keying (ASK), ON-OFF keying (OOK or ON-OFF shift keying), quadrature amplitude modulation (QAM), and so on. In some aspects, the transceiver 220 further comprises a power amplifier, which amplifies the modulated signal and sends it to the antenna 260 for transmission. In some aspects, the power amplifier of the transceiver 220 can also amplify the reflected second part of the second RF emission described above.

In some aspects, the processor 210 controls directionalities of the antenna 260. For example, the processor 210, coupled with the transceiver 220, controls a radiation pattern of the antenna 260 and points the antenna 260 toward a direction. The processor 210 can control the radiation pattern of the antenna 260 using components of the transceiver 220, such as phase shift circuit. The processor 210 can control the radiation pattern of the antenna 260 to point to the source device 102 when transmitting the modulated signal or reflecting the second part of the second RF emission. In some aspects, the antenna 260 comprises an antenna array that includes two or more antennas. In such a case, the processor 210, coupled with the transceiver 220, changes the radiation pattern of the antenna 260 by configuring beamforming of the antenna array. In other aspects, the system 200A performs unidirectional transmission of the modulated signal or reflects the second part of the second RF emission.

In some aspects, the system 220, such as the electronic device 104, reflects a part of the RF emission to other devices, such as the electronic device 106, in addition to the source device 102. For example, the electronic device 104 reflects the part of the RF emission received from the source device 102 to the electronic 106 when the processor 210 determines that an energy level of the power-storage unit 270 is above a threshold. In some aspects, the processor 210 monitors the energy level of the power-storage unit 270. The processor 210 may determine that the energy level is higher than the threshold while the antenna 260 receives the RF emission. For example, the antenna 260 receives RF emission in a 10 ms period. After a time point of 5 ms, the processor 210 may determine that the energy level is higher than the threshold. The system 200A then reflects the remaining RF emission to other electronic devices, such as the electronic device 106. In some aspects, the part of the RF emission reflected by the electronic device 104 also includes the configuration message.

In some aspects, the system 200A reflects the remaining RF emission by controlling the variable impedance of the transceiver 220. For example, the processor 210 changes the variable impedance of the transceiver 220 so that it does not match the impedance of the antenna 260. In some aspects, the processor 210 also changes the radio pattern of the antenna 260 to point to the electronic device 106.

In some aspects, the electronic device 104 determines the threshold based on the configuration message received from the source device 102. For example, the configuration message includes a power level value of the threshold. In some aspects, the configuration message may indicate the threshold to be an energy level that supports certain functions of the electronic device 104. For example, the threshold corresponds to energy consumptions of components of the electronic device 104. The threshold may indicate 1.0 volt for operations of the processor 210 and indicate 3.3 volts for stable operations of the transceiver 220 and the memory 250. For another example, the configuration message indicates the threshold to be an energy level to support the electronic device 104 to transmit the modulated signal or reflect the second part of the second RF emission to the source device 102. In such a case, the processor 210 determines the threshold by estimating power consumptions of the processor 210 and transceiver 220 to transmit the modulated signal or reflect the second part of the second RF emission to the source device 102 or transmit to the electronic devices 106 and 108. For example, as described in more details below, the threshold corresponds to signal qualities, such as signal-to-noise (SNR). The electronic device 104 can perform calibrations with the source device 102 and the electronic devices 106 and 108 to estimate a power level required to satisfy the signal qualities. The electronic device 104 can estimate by performing channel estimation or other estimations. In some aspects, the configuration message indicates the threshold to also include power consumptions of the sensor unit of the electronic device 104 so that the sensor unit can gather additional information. Therefore, the processor 210 may also estimate power consumptions of the sensor unit.

In some aspects, the configuration message indicates the threshold to be an energy level that supports functions of the electronic device 104 for a period of time. For example, the configuration message may indicate that the threshold supports the electronic device 104 to gather additional information using the sensor unit and transmit the modulated signals based on the additional information for 100 ms. The processor 210 then determines the threshold by estimating power consumptions in 100 ms. In some aspects, the source device 102 transmits the RF emission periodically. The electronic device 104 can determine the threshold based on the periodicity of the RF emission from the source device 102. For example, the source device 102 transmits the RF emission for 10 ms for every 20 ms. In such a case, if the configuration message indicates a period of 100 ms, the electronic device 104 may determine the threshold based on a period of 20 ms, instead of the period of 100 ms, because the electronic device 104 can be charged by a second RF emission after 20 ms. In other words, the electronic device 104 considers future RF emissions when determining the threshold. In some aspects, the configuration message may indicate periodicity of RF emissions of the source device 102. In other aspects, the electronic device 104 may infer (e.g., via averaging and/or regression) or otherwise determine the periodicity based on the RF emissions received previously.

In some aspects, the source device 102 determines the periodicity of the RF emission based on required information. For example, the source device 102 includes a request for results of monitoring a patient in the RF emission, which triggers the source devices 104, 106, and/or 108 to transmit information (e.g., regarding a patient or other subject of monitoring) back to the source device 102. The source device 102 may transmit the RF emission every 30 seconds. In such a case, the information of the patient is updated every 30 seconds.

In other aspects, the source device 102 may include the request in some RF emissions. For example, the source device transmits the RF emission every 30 seconds. However, the source device includes the request in the RF emission every 30 minutes. In other words, not all RF emissions include the request. In yet another aspect, the source device 102 transmits the RF emission when an update of the patient information is required. To operate clocks, timers, or other means of determining or enforcing periodic actions, the source device 102 may include a system clock, system timer, or equivalent circuitry, systems, or services, for example, running at an equal or greater frequency (equal or shorter period or periodicity) than that of any other recurring operation or action of monitoring or generating signals or RF emissions, according to some example use cases.

In some aspects, the electronic device 104 can determine the threshold based on conditions of the electronic device 104. For example, the electronic device 104 determines the threshold based on an amount of the information stored in the memory 250. Specifically, the electronic device 104 estimates energies required to transmit the information stored in the memory 250. In addition, the electronic device 104 can determine the threshold based on transmission of the information. For example, the electronic 104 waits until the transmission of the information is complete to reflect the remaining RF emission to the electronic device 106. In some aspects, the electronic device 104 can also determine based on energies required by other devices, such as the electronic device 106. For example, the electronic device 106 transmits a request for energy to the electronic device 104. The electronic device 104 estimates a total energy of the RF emission and determines the threshold by deducting the requested energy from the total energy of the RF emission. In some aspects, the electronic device 104 considers the requested energy of the electronic device 106 to be the same as the electronic device 104. In such a case, the electronic device 104 determines the threshold to be a half of the total energy of the RF emission.

In some aspects, the electronic device 106 also reflects the RF emission received from the electronic device 104 to the electronic device 108 in a similar way. For example, the electronic device 106 determines a threshold of the electronic device 106 as described above. The electronic device 106 determines that an energy level of a power-storage unit 270 of the electronic device 106 is above the threshold and reflects the remained RF emission to the electronic device 108. In some aspects, the electronic device 106 determines location information of the electronic devices 104 and 108 in a neighboring discovery process as described above. In such as case, the processor 210 of the electronic device 106 can configure a radiation pattern of the antenna 260 of the electronic device 106 to point to the electronic device 108 when reflecting the RF emission to the electronic device 108.

In some aspects, the electronic device 104 relays signals from the electronic device 106 to the source device 102. For example, the electronic device 104 receives the signals from the electronic device 106. The electronic device 104 also receives a second RF emission from the source device 102. The electronic device 104 modulates a portion of the second RF emission based on the signals received from the source device 102 and transmits the modulated portion of the second RF emission back to the source device 102. The electronic device 104 can modulate the portions of the second RF emission using the ON-OFF shift keying modulation scheme or generate a reporting message using other modulations.

As discussed in more detail below with respect to FIGS. 3-6, the system 200A may implement different mechanisms for the power retransmissions in the mesh network as discussed with respect to the system 100 of FIG. 1.

Figure 2B:
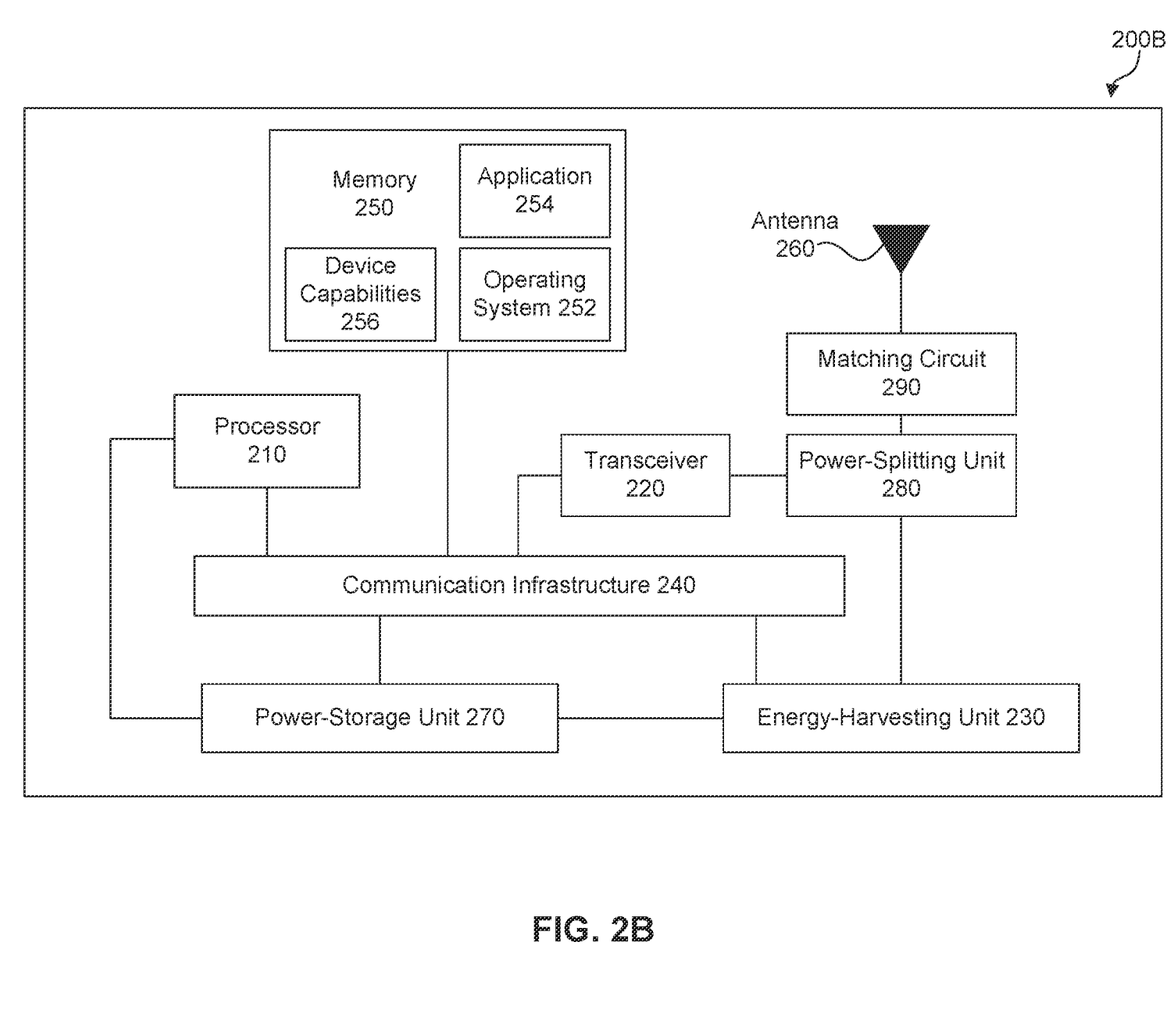

FIG. 2A illustrates a block diagram of an example system 200B of an electronic device implementing the power retransmissions of a mesh network, according to some aspects of the disclosure. The system 200B may be any of the devices (e.g., the source device 102 and the electronic devices 104, 106, and 108) of the system 100. The system 200B includes a processor 210, one or more transceivers 220, an energy-harvesting unit 230, a communication infrastructure 240, a memory 250, an operating system 252, an application 254, one or more antennas 260, one or more power-storage unit 270, a power-splitting unit 280, and a matching circuit 290. Illustrated systems are provided as exemplary parts of system 200B, and system 200B may include other circuit(s) and subsystem(s). Also, although the systems of system 200B are illustrated as separate components, the aspects of this disclosure may include any combination of these, e.g., less, or more components.

Functions of the processor 210, the transceiver 220, the energy-harvesting unit 230, the communication infrastructure 240, the memory 250, the operating system 252, the application 254, the one or more antennas 260, the one or more power-storage unit 270, and the power-splitting unit 280 of the system 200B are similar to those of the system 200A of FIG. 2A. Either or both of the matching circuit 290 and/or the transceiver 220 may be configured to allow variable impedance. In some aspects, the matching circuit 290 may include a variable impedance, while the transceiver 220 may not include the variable impedance, for example. In other aspects, the transceiver 220 may include the variable impedance. The processor 210 controls the matching circuit 290 and configures an impedance value of the variable impedance. For example, the processor 210 can configure the impedance value to be within the characteristic impedance range 602, as described above. In such a case, RF emissions received by the antenna 260 pass through the matching circuit 290 and are split to the transceiver 220 and the energy-harvesting unit 230 by the power-splitting unit 280. On the other hand, the processor 210 can configure the impedance value to be outside the characteristic impedance range 602. In such cases, the RF emissions are reflected to the source device 102 or the electronic devices 106 or 108.

As discussed in more detail below with respect to FIGS. 3-6, the system 200B may implement different mechanisms for the power retransmissions in the mesh network as discussed with respect to the system 100 of FIG. 1.

Figure 3:
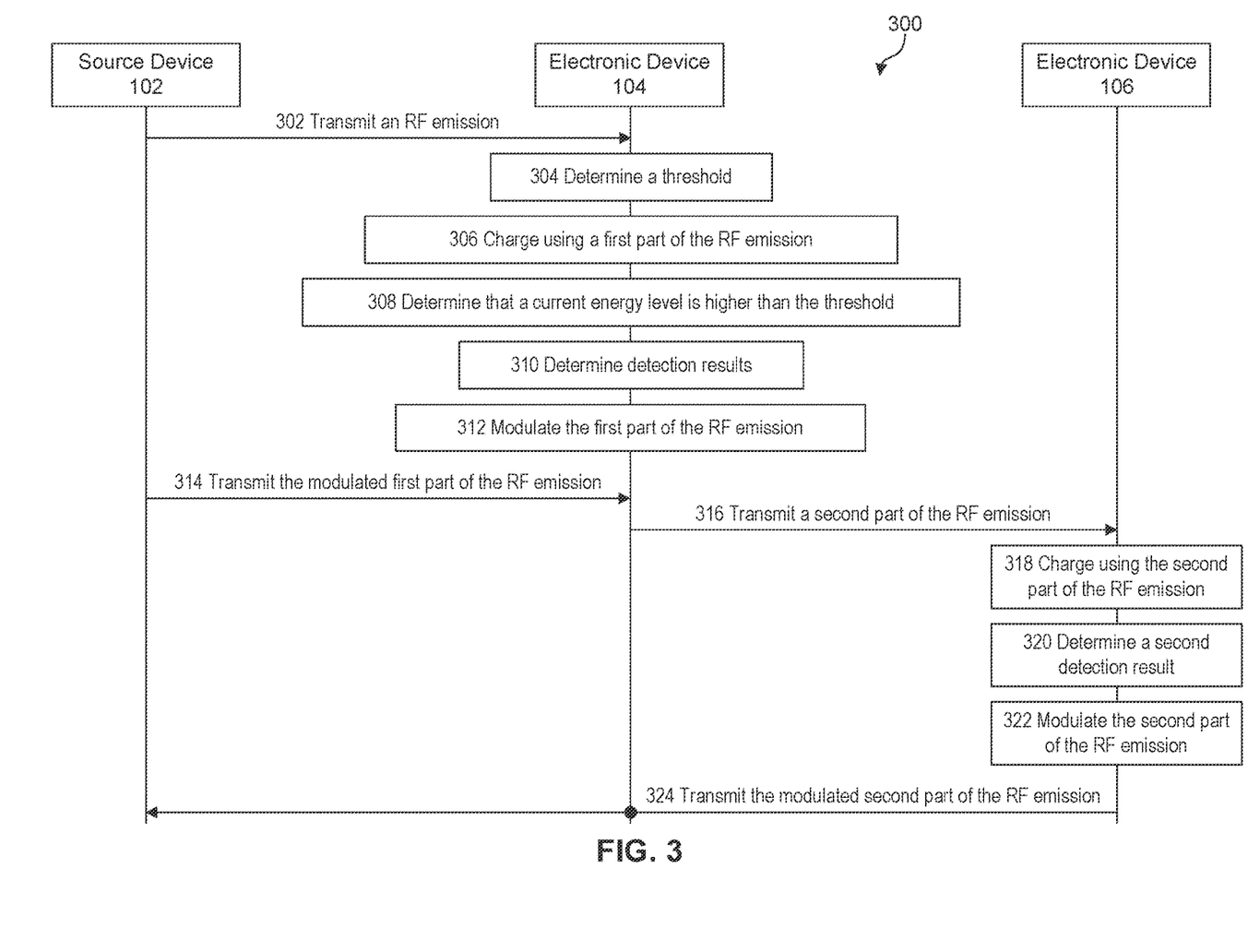
FIG. 3 illustrates an example method for multi-device power retransmissions, according to aspects of the disclosure.

FIG. 3 illustrates an example method 300 for multi-device power retransmissions. As a convenience and not a limitation, FIG. 3 may be described with regard to elements of FIGS. 1, 2A, 2B, and 5. Method 300 may represent the operation of devices (for example, the source device 102 and the electronic devices 104, 106, and 108 of FIG. 1) implementing the multi-device power retransmissions. The example method 300 may also be performed by system 200A of FIG. 2A or 200B of FIG. 2B, controlled or implemented by processor 210, and/or computer system 500 of FIG. 5. But method 300 is not limited to the specific aspects depicted in those figures and other systems may be used to perform the method, as will be understood by those skilled in the art. It is to be appreciated that not all operations may be needed, and the operations may not be performed in the same order as shown in FIG. 3.

At 302, source device 102 transmits an RF emission to the device 104. In some aspects, the RF emission includes a configuration message. The sources device 102 configures electronic devices, such as electronic devices 104, 106, and 108 using the configuration message. In some aspects, the source device 102 repeats the configuration message a plurality of times in the RF emission.

At 304, the electronic device 104 determines a threshold. In some aspects, the configuration message includes the threshold. For example, the electronic device 104 decodes the RF emission and extracts the configuration message. In some aspects, because the configuration message repeats in the RF emission, the electronic device 104 can extract the configuration message by decoding any portions the RF emission, such as a beginning of the RF emission. In some aspects, the configuration message indicates the threshold to be an energy level to support certain functions of the electronic device 104 as described above. In such a case, the electronic device 104 determines the threshold by estimating the energy level.

At 306, the electronic device 104 charges using a first part of the RF emission. For example, the electronic device 104 harvests electrical energies from the first part of the RF emission using an energy-harvesting unit 230 of the electronic device 104. In some aspects, the electronic device 104 determines the first part of the RF emission based on the threshold. For example, the electronic device 104 estimates a current energy level of the electronic device 104 and determines the first part of the RF emission based on a difference between the current energy level and the threshold. The electronic device 104 also uses the first part of the RF emission to transmit backscatter signals. In some aspects, the electronic device 104 determines the first part of the RF emission by monitoring the current energy level of the electronic device 104, as described below in 308.

At 308, the electronic device 104 determines that the current energy level is higher than the threshold. In some aspects, the current energy level increases as the electronic device 104 charges using the first part of the RF emission. The electronic device 104 monitors the current energy level of the electronic device 104 constantly and determines whether the current energy level is higher than the threshold. For example, the electronic device 104 monitors the current energy level by monitoring a voltage level of the power-storage unit 270 of the electronic device 104. In some aspects, the electronic device 104 considers a tolerance level. For example, the electronic device 104 considers a tolerance level of 10% and determines whether the current energy level is higher than 110% of the threshold. On the other hand, the electronic device 104 can also determine whether the current energy level is higher than 90% of the threshold. In some aspects, the electronic device 104 stops charging when the current power level is higher than the threshold.

In this way, by checking to determine when a threshold is reached, embodiments provide that the electronic device 104 has enough energies to perform certain functions, such as determining detection results in 308, modulation in 312, and transmission in 314.

At 310, the electronic device 104 determines detection results. In some aspects, as described above, the electronic device 104 can gather information, such as occupancy statuses, presence status, patient statuses, and environment information. The electronic device 104 can be a dedicated sensor that gathers certain kinds of information. For example, the electronic device 104 may be a temperature sensor that gathers temperature information of a nearby environment. In some aspects, the electronic device 104 can be a general sensing device. For example, the electronic device 104 may be able to gather patient statuses by monitoring a pulse rate, a body temperature, an oxygen level, and/or movements of a patient. In such a case, the configuration message indicates required information. For example, the configuration message may indicate the body temperature and the electronic device 104 measures the body temperature of a patient without gathering other information to save power.

In some aspects, the electronic device 104 determines detection results by receiving from a presence detector. For example, the presence detector is coupled with the electronic device 104 and constantly transmits the detection results to the electronic device 104. In other aspects, the electronic device 106 can be the presence detector and transmits the detection results to the electronic device 104 via the wireless connection 112.

At 312, the electronic device 104 modulates the first part of the RF emission. For example, the electronic device 104 modulates the first part of the RF emission using the ON-OFF shift keying modulation scheme based on the detection results. The modulated first part of the RF emission can be backscatter signals. In other words, the first part of the RF emission includes a first and a second portions. The electronic device 104 charges using the first portion and generates the backscatter signals using the second portion. In other aspects, the electronic device 104 can also generate signals based on the detection results using modulation schemes such as amplitude modulation, frequency modulation, frequency shift keying, phase shift keying, amplitude shift keying, quadrature amplitude modulation, and so on.

At 314, the electronic device 104 transmits the modulated first part of the RF emission to the source device 102. In some aspects, the electronic device 104 controls a radiation pattern of the antenna 260 of electronic device 104 to point to the source device 102 when transmitting the modulated first part of the RF emission. For example, the configuration message includes location information of the source device 102 and the electronic device 104 points the antenna 260 towards a location of the source device 102 based on the location information. The electronic device 104 can also estimate an angle of arrival of the RF emission received from the source device 102 and control the radiation pattern of the antenna 260 based on the angle of arrival of the RF emission. For example, the electronic device 104 can scan 360° in 10° angular increments and estimate signal power levels of each incremental angle. The electronic device 104 can determine the angle of arrival to be an estimated angle with a strongest power level of the RF emission received from the source device 102.

In some aspects, the modulated first part of the RF emission arrives at the source device 102 with certain signal qualities. For example, the signal qualities include a received signal power, a SNR, a bit error rate (BER), a block error rate (BLER), and so on. The source device 102 can configure the signal qualities using the configuration message. For example, the configuration message indicates minimum signal qualities, such as a minimum received signal power. In such a case, the electronic device 104 determines the threshold in 304 based on the minimum signal qualities. For example, the electronic device 104 comprises a power amplifier that amplifies the modulated first part of the RF emission so that it arrives at the source device 102 with a signal power that is higher than the minimum received signal power. The electronic device 104 can determine the threshold based on power consumptions of the power amplifier. For the same reasons above, the electronic device 104 transmits the modulated first part of the RF emission to the source device 102 when it determines that the current energy level is higher than the threshold.

In some aspects, the electronic device 104 also considers channel conditions of the wireless connection 110 when determining the threshold. For example, the transmitted modulated first part of the RF emission experiences degradation, such as a path loss, when traveling from the electronic device 104 to the source device 102. The electronic device 104 amplifies the modulated first part of the RF emission to compensate for the path loss. In some aspects, the channel conditions of the wireless connection 110 are reciprocal. In such a case, the electronic device 104 estimates the channel conditions based on the RF emission received from the source device 102. The source device 102 can also estimate the channel conditions of the wireless connection 110 based on signals received from the electronic device 104, such as the feedback message from the electronic device 104. The source device 102 can then include the channel conditions of the wireless connection 110 in the configuration message, wherein the configuration message is transmitted to the electronic device 104 by the source device 102 as described above.

At 316, the electronic device 104 transmits a second part of the RF emission. In some aspects, the electronic device 104 determines the second part of the RF emission based on the first part of the RF emission. For example, the electronic device 104 estimates a total energy level of the RF emission and determines the second part of the RF emission by subtracting an energy level of the first part of the RF emission from the total energy level. The electronic device 104 can estimate the total energy level of the RF emission based on RF emissions received previously. The electronic device 104 can also determine the total energy level of the RF emission based on the configuration message. In some aspects, the electronic device 104 waits until the transmission of 314 completes to transmit the second part of the RF emission to the electronic device 106. In other words, the electronic device 104 transmits to the source device 102 and to the electronic device 106 sequentially.

In some aspects, the electronic device 104 controls the radiation pattern of the antenna 260 of electronic device 104 to point to the electronic device 106 when transmitting the second part of the RF emission. For example, electronic device 104 determines a location of the electronic device 106 in a neighbor discovery process and points the antenna 260 towards the location of the electronic device 106. The electronic device 104 can also predict the location of the electronic device 106 when the electronic device 106 is mobile. For example, the electronic device 104 determines a velocity of the electronic device 106 based on previous locations of the electronic device 106. The electronic device 104 then predicts a current location of the electronic device 106 based on a last known location and the velocity of the electronic device 106.

At 318, the electronic device 106 charges using the second part of the RF emission similarly as the electronic device 106 in 306.

At 320, the electronic device 106 determines a second detection result. Similar to 310, the electronic device 106 can gather information, such as occupancy statuses, patient statuses, and environment information. The electronic device 106 can be a dedicated sensor that gathers certain kinds of information. For example, the electronic device 106 may be a temperature sensor that gathers temperature information of a nearby environment. In some aspects, the electronic device 106 can be a general sensing device. For example, the electronic device 106 may be able to gather patient statuses by monitoring a pulse rate, a body temperature, an oxygen level, and movements of a patient. In other aspects, the configuration message indicates required information. For example, the electronic device 106 decodes and extracts the configuration message from the second part of the RF emission received from the electronic device 104. The configuration message may indicate the body temperature and the electronic device 106 may measure the body temperature without gathering other information to save power.

At 322, the electronic device 106 modulates the second part of the RF emission. The electronic device 106 can modulate the second part of the RF emission using at least one modulation technique, such as the ON-OFF shift keying modulation scheme, other modulation techniques disclosed elsewhere herein, or equivalent(s), based on the second detection result. The modulated second part of the RF emission can be backscatter signals. In other words, the second part of the RF emission includes a first and a second portions. The electronic device 106 charges using the first portion and generates the backscatter signals using the second portion. In other aspects, the electronic device 106 can also generate signals based on the second detection result using modulation schemes such as amplitude modulation, frequency modulation, frequency shift keying, phase shift keying, amplitude shift keying, quadrature amplitude modulation, and so on.

At 324, the electronic device 106 transmits the modulated second part of the RF emission to the source device 102. In some aspects, the electronic device 106 transmits to the source device 102 directly via the wireless connection 116. The electronic device 106 may comprise a power amplifier that amplifies the modulated second part of the RF emission before transmission. In other aspects, the electronic device 106 transmits the modulated second part of the RF emission to the source device 102 indirectly via the electronic device 104. The electronic device 106 may configure the modulated second part of the RF emission to indicate the indirection transmission. For example, the electronic device 106 can add a header in the modulated second part of the RF emission, wherein the header indicates the source device 102 as a destination. The electronic device 104, upon receiving the modulated second part of the RF emission, can extract the destination from the header and retransmits to the source device 102.

In some aspects, the electronic device 106 determines whether to transmit directly or indirectly based on an energy level of the electronic device 106. For example, if the energy level of the electronic device 106 is above a direct transmission threshold, the electronic device 106 transmits directly to the source device 102. Otherwise, the electronic device 106 transmits indirectly via the electronic device 104. In other aspects, the electronic device 106 determines whether to transmit directly or indirectly based on an energy level of the second part of the RF emission. For example, when the electronic device 106 transmits the modulated second part of the RF emission as backscatter signals, such as the modulated second part of the RF emission, signal strengths of the backscatter signals depend on signal strengths of the second part of the RF emission received. If the signal strengths of the second part of the emission are higher than a direct backscatter threshold, the electronic device 106 transmits to the source device 102 directly via the wireless connection 116. Otherwise, the electronic device 106 transmits indirectly via the electronic device 104. In some aspects, the electronic devices 104, 106, and 108 can determine the direct backscatter threshold during an initialization period. For example, the electronic devices 104, 106, and 108 can determine the direct backscatter threshold after the initialization process for authentication as described above. The electronic device 104 can calibrate with the electronic device 106 to determine the direct backscatter threshold. The calibration can be based on signal qualities, such as an SNR, as described above.

Figure 4:
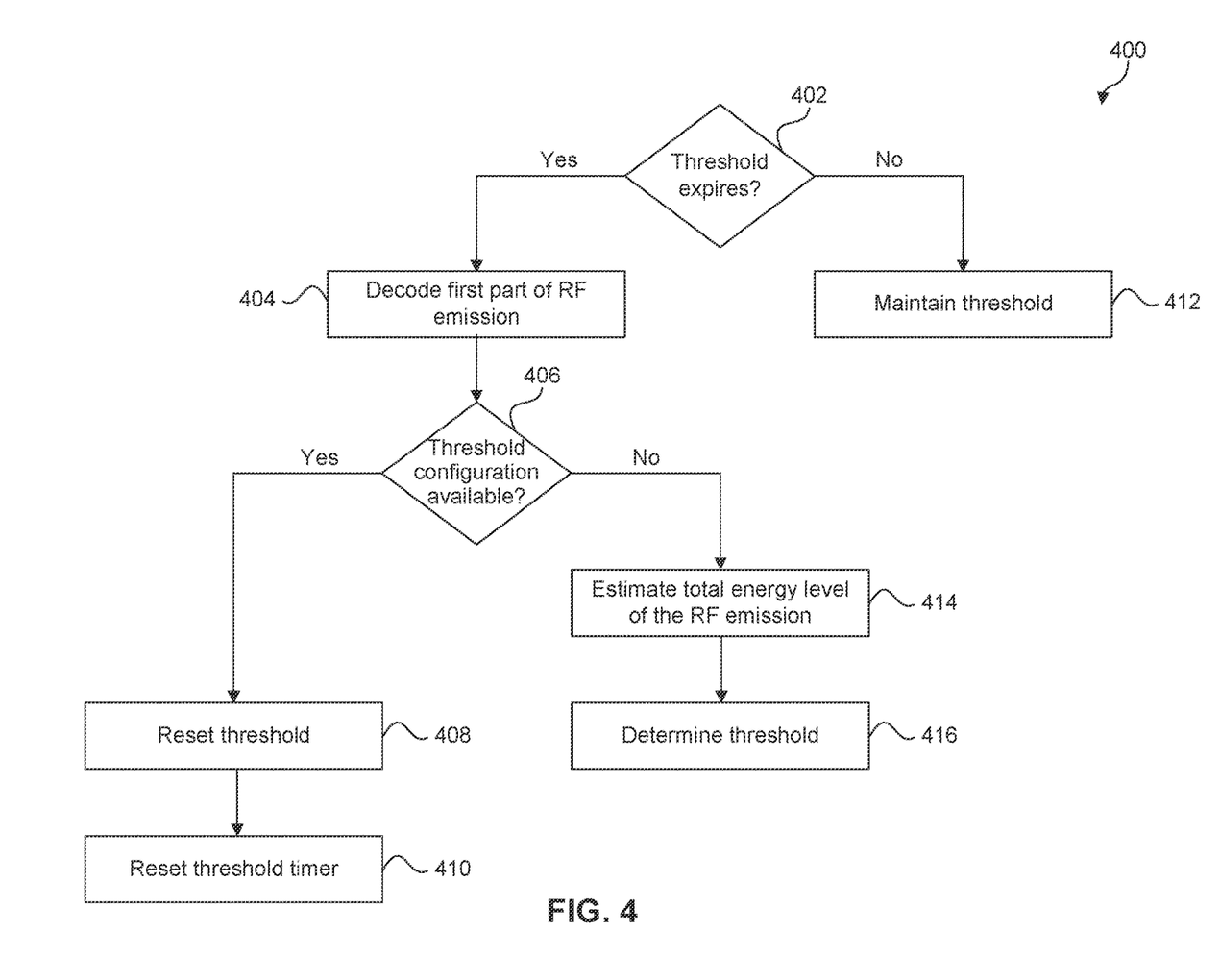
FIG. 4 illustrates an example method for determining a threshold of the power retransmissions in the mesh network, according to aspects of the disclosure.

FIG. 4 illustrates an example method for determining a threshold of the power retransmissions in the mesh network, as described in 304 of FIG. 3. As a convenience and not a limitation, FIG. 4 may be described with regard to elements of FIGS. 1, 2, and 5. Method 400 may represent the operation of devices (for example, the source device 102 and the electronic devices 104, 106, and 108 of FIG. 1) implementing the power retransmissions in the mesh network. The example method 400 may also be performed by system 200A of FIG. 2A or 200B of FIG. 2B, controlled or implemented by processor 210, and/or computer system 500 of FIG. 5. But method 400 is not limited to the specific aspects depicted in those figures and other systems may be used to perform the method, as will be understood by those skilled in the art. It is to be appreciated that not all operations may be needed, and the operations may not be performed in the same order as shown in FIG. 4.

At 402, the electronic device 104 determines whether a threshold expires. In some aspects, the electronic device 104 determines the threshold based on the configuration message received from the source device 102. The configuration message may also include a lifetime of the threshold, such as 5 seconds. In other words, the threshold expires in 5 seconds after the electronic device 104 determines the threshold. If the threshold is expired, the control moves to 404.

At 404, the electronic device 104 decodes a first part of a RF emission received from the source device 102 and extracts the configuration information as described above.

At 406, the electronic device 104 determines whether a threshold configuration is available. For example, the electronic device 104 determines whether the configuration message indicates the threshold. In some aspects, the configuration message includes other information, such as channel conditions and a total power level of the RF emission, but not an indication of the threshold. In other aspects, the configuration message indicates the threshold. In such a case, the control moves to 408.

At 408, the electronic device 104 resets the threshold by determining a new threshold based on the configuration message, as described in 304 of FIG. 3.

At 410, the electronic device 104 resets a threshold timer based on a lifetime of the threshold indicated in the configuration message.

Referring back to 402, if the threshold expires, the control moves to 412.

At 412, the electronic device 104 maintains the threshold. In some aspects, the electronic device 104 does not extract the configuration message because there is no need to update the threshold. In other aspects, the electronic device 104 extracts the configuration message to obtain other information, such as channel conditions, even though the threshold is not expired.

Referring back to 406, if the threshold configuration is not available in the configuration message, the control moves to 414.

At 414, the electronic device 104 estimates a total energy level of the RF emission. For example, the electronic device 104 determines the total energy level based on RF emissions received previously. In some aspects, the electronic device 104 determines the total energy level of the RF emission based on a running average of energy levels of the previously received RF emissions. For example, the electronic device 104 can store data representing the energy levels of the previously received RF emissions in the memory 250 when calculating the running average. In other aspects, the electronic device 104 determines the total energy level based on the configuration message.

At 416, the electronic device 104 determines the threshold based on the total energy level. For example, the electronic device 104 determines the threshold to be a predetermined portion of the total energy level, such as 50%. In some aspects, the electronic device 104 can determine the predetermined portion based on the configuration message. In some aspects, the electronic device 104 determines the threshold based on characteristics of the RF emission. For example, the electronic device 104 may determine that the RF emission includes a beacon. The electronic device 104 can determine based on previously received RF emissions or based on the configuration message received from the source device 102. In such a case, the electronic device 104 splits the beacons of the RF emission equally into a first half and a second half. In other words, the threshold is 50% of a total energy of the beacon.

Figure 5:
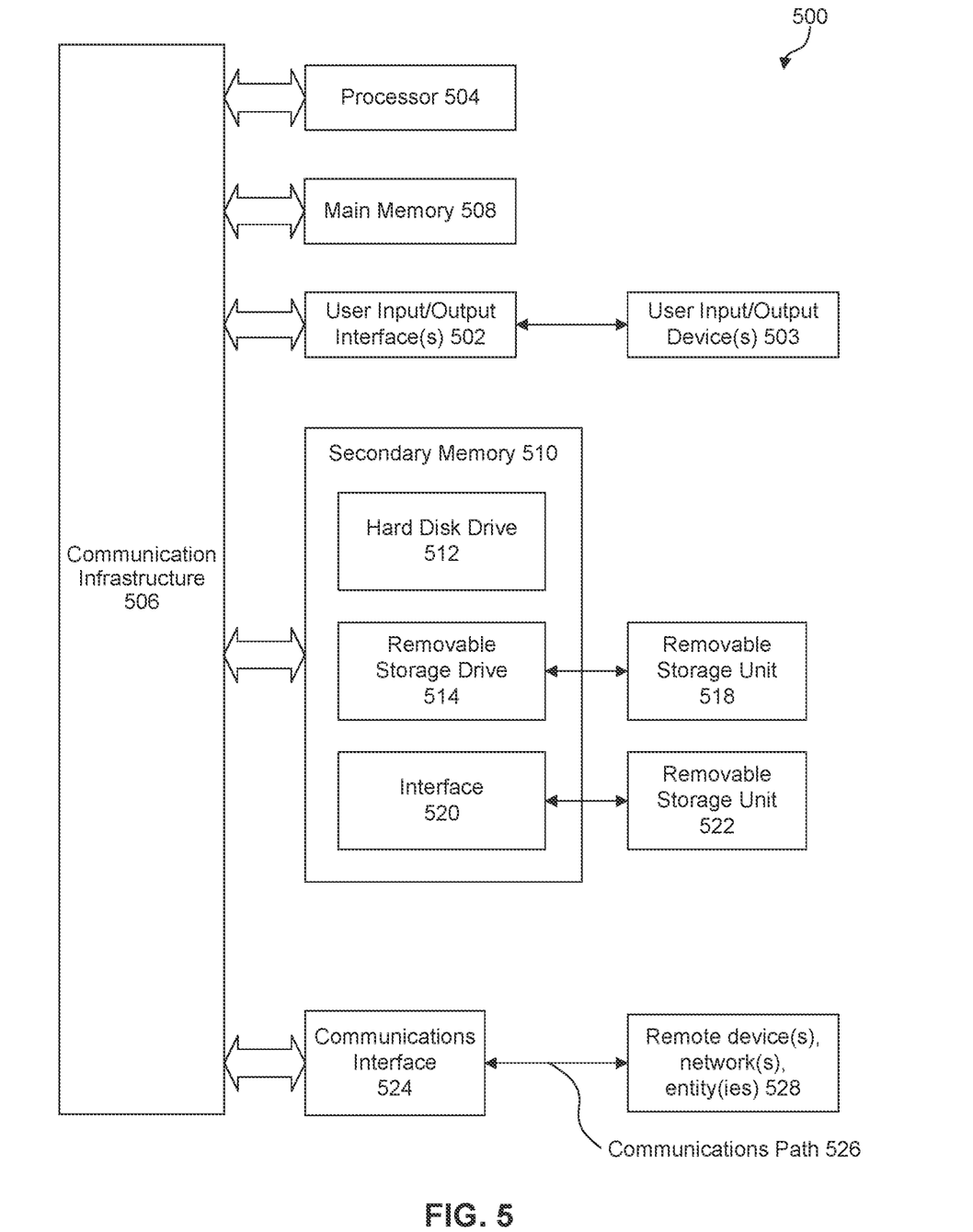
FIG. 5 is an example computer system for implementing some aspects of the disclosure or portion(s) thereof.

Various aspects may be implemented, for example, using one or more computer systems, such as computer system 500 shown in FIG. 5. Computer system 500 may be any computer capable of performing the functions described herein once programmed, including the functions described ins FIGS. 3-4, by source devices 102 and electronic devices 104, 106, and 108 of FIG. 1, 200A of FIG. 2A, or 200B of FIG. 2B. Computer system 500 includes one or more processors (also called central processing units, or CPUs), such as a processor 504. Processor 504 is connected to a communication infrastructure 506 (e.g., a bus.) Computer system 500 also includes user input/output device(s) 503, such as monitors, keyboards, pointing devices, etc., that communicate with communication infrastructure 506 through user input/output interface(s) 502. Computer system 500 also includes a main or primary memory 508, such as random access memory (RAM). Main memory 508 may include one or more levels of cache. Main memory 508 has stored therein control logic (e.g., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to some aspects, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526.

The operations in the preceding aspects may be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 500, main memory 508, secondary memory 510 and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 5. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A device, comprising:
   one or more antennas configured to receive a radio frequency (RF) emission wirelessly from a source device;
   a power splitting circuitry configured to:
      split the RF emission into a first part and a second part of the RF emission based on a threshold; and
      transmit the first part of the RF emission to an energy harvesting circuitry while transmitting the second part of the RF emission to a wireless transceiver;
   the energy harvesting circuitry configured to charge the device using the first part of the RF emission;
   the wireless transceiver configured to receive the second part of the RF emission; and
   at least one processor communicatively coupled to the wireless transceiver and configured to:
      determine that an energy level of an energy storage unit of the device is above the threshold; and
      in response to determining that the energy level is above the threshold, transmit, using the wireless transceiver, the second part of the RF emission wirelessly to a second device to charge the second device.

2. The device of claim 1, wherein the at least one processor is further configured to:
   modulate the first part of the RF emission based on information detected by the device; and
   transmit, using the wireless transceiver, the modulated first part of the RF emission to the source device in response to determining that the energy level is above the threshold.

3. The device of claim 1, wherein the at least one processor is further configured to:
   determine whether a power level of transmitting the second part of the RF emission is above an interference threshold to other devices in a range; and
   adjust the power level based on results of the determining.

4. The device of claim 1, wherein the at least one processor is further configured to determine the threshold based on a second energy level that supports functions of the device.

5. The device of claim 4, wherein the device comprises a sensor, and wherein the functions of the device comprises information gathering of the sensor.

6. The device of claim 4, wherein the second energy level supports the functions of the device for a predetermined period of time.

7. The device of claim 1, wherein the at least one processor is further configured to determine the threshold based on a periodicity of the RF emission.

8. The device of claim 7, wherein the at least one processor is further configured to determine the periodicity of the RF emission based on a configuration message received from the source device.

9. The device of claim 7, wherein the at least one processor is further configured to determine the periodicity of the RF emission based on previously received RF emissions.

10. The device of claim 1, wherein the at least one processor is further configured to determine the threshold based on an amount of information stored in the device.

* * * * *